United States Patent
Jindal

(10) Patent No.: US 9,112,563 B1
(45) Date of Patent: Aug. 18, 2015

(54) PER-TONE TX ANTENNA SELECTION BEAMFORMING

(71) Applicant: BROADCOM CORPORATION, Irvine, CA (US)

(72) Inventor: Nihar Jindal, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/279,162

(22) Filed: May 15, 2014

Related U.S. Application Data

(60) Provisional application No. 61/986,732, filed on Apr. 30, 2014.

(51) Int. Cl.
| | | |
|---|---|---|
| *H04L 27/00* | (2006.01) | |
| *H04B 7/06* | (2006.01) | |
| *H04B 7/04* | (2006.01) | |
| *H04L 25/02* | (2006.01) | |
| *H04L 27/26* | (2006.01) | |

(52) U.S. Cl.
CPC ............ *H04B 7/0617* (2013.01); *H04B 7/0408* (2013.01); *H04L 25/0204* (2013.01); *H04L 27/2626* (2013.01)

(58) Field of Classification Search
CPC ............... H04B 7/0617; H04B 7/0408; H04L 27/2626; H04L 25/0204
USPC .......................................................... 375/295
See application file for complete search history.

(56) References Cited

U.S. PATENT DOCUMENTS

| | | | | |
|---|---|---|---|---|
| 8,126,077 | B2 * | 2/2012 | Sandhu .......................... | 375/267 |
| 2006/0078058 | A1 * | 4/2006 | Lin ................................ | 375/260 |
| 2006/0274852 | A1 * | 12/2006 | Trachewsky et al. .......... | 375/295 |
| 2007/0110197 | A1 * | 5/2007 | Bagchi et al. .................. | 375/349 |
| 2007/0230594 | A1 * | 10/2007 | Mo et al. ........................ | 375/260 |
| 2009/0161782 | A1 * | 6/2009 | Kolze et al. .................... | 375/260 |
| 2011/0032875 | A1 * | 2/2011 | Erceg et al. .................... | 370/328 |
| 2011/0158348 | A1 * | 6/2011 | Ponnampalam et al. ...... | 375/298 |

\* cited by examiner

*Primary Examiner* — Erin File
(74) *Attorney, Agent, or Firm* — McDermott Will & Emery LLP

(57) ABSTRACT

A method for per-tone transmit (TX) antenna selection beamforming includes obtaining an estimate of a per-tone channel amplitude information corresponding to each antenna of multiple antennas of a transmitter. A spatial mapping matrix of the transmitter is determined using the obtained estimate of the per-tone channel amplitude information corresponding to the antennas. Each tone includes an orthogonal frequency-division multiplexing (OFDM) sub-carrier, and the per-tone channel amplitude information corresponding to each antenna is associated with a propagation channel between that antenna and a receive (RX) antenna of a receiver. The spatial mapping matrix is determined to allow transmission of data corresponding to each tone through one of the antennas, and to allow each of the antennas to be active during a transmission time of the transmitter.

20 Claims, 6 Drawing Sheets

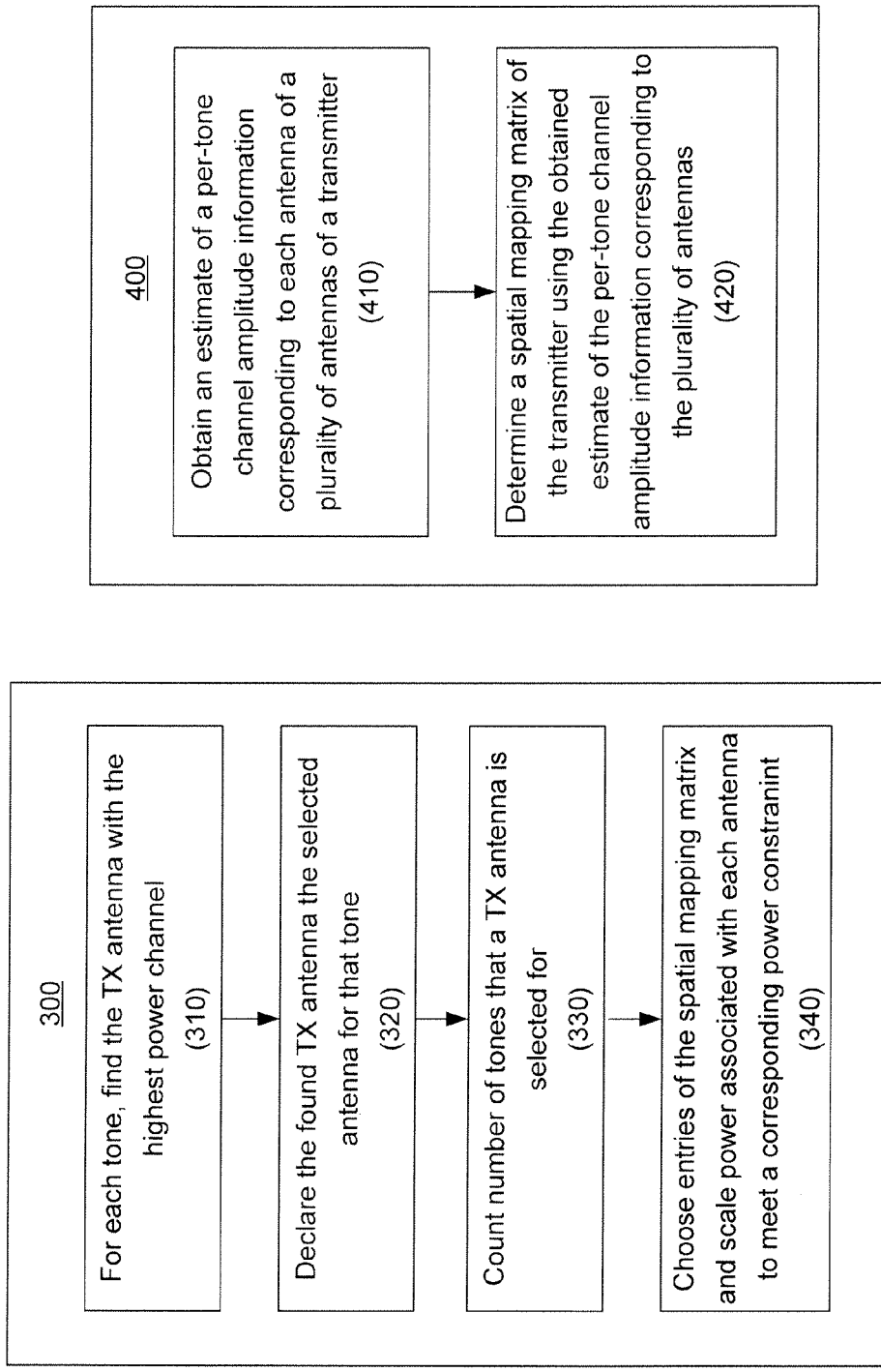

PER-TONE TX ANTENNA SELECTION BEAMFORMING

CROSS-REFERENCE TO RELATED APPLICATIONS

This application claims the benefit of priority under 35 U.S.C. §119 from U.S. Provisional Patent Application 61/986,732 filed Apr. 30, 2014, which is incorporated herein by reference in its entirety.

TECHNICAL FIELD

The present description relates generally to wireless communications, and more particularly, but not exclusively, to per-tone TX antenna selection beamforming.

BACKGROUND

In radio-frequency (RF) communications, multiple-input-multiple-output (MIMO) refers to using multiple antennas at both the transmitter and the receiver ends to enhance communication performance. The terms input and output in MIMO denote the radio channels that carry the input and output signals received by or transmitted from a communication device (e.g., a transceiver). MIMO, which is an important portion of modern wireless communication standards such as IEEE 802.11n (e.g., Wi-Fi), 4G, 3GPP Long Term Evolution (LTE), IEEE 802.16e (e.g., WiMAX), and others, can use transmit beamforming to significantly increase data throughput and link range without the need for additional bandwidth or increased transmission power. Practically, the majority of wireless communication standards including 802.11ac have adopted a multicarrier modulation scheme known as orthogonal frequency division multiplexing (OFDM), which is based on frequency division multiplexing (FDD) concept.

In OFDM, each data stream, instead of being modulated on a single wide-band carrier, is modulated on a large number (e.g., hundreds or even thousands) of parallel narrow-band adjacent sub-carriers (e.g., tones). For example, a serial data stream can be split into multiple slower data stream, and each stream can be modulated using a modulation scheme, such as quadrature amplitude modulation (QAM), or any other modulation scheme. The modulated subcarriers are then passed through an inverse fast Fourier transform (IFFT) module such as inverse discrete Fourier transform (IDFT) module that converts them into a single stream of analog data. In technologies based on 802.11ac standard, transmit (TX) beamforming is implemented via a spatial mapping matrix (e.g., Q). Currently, for single-stream TX beamforming, the maximum-ratio transmission (MRT) scheme is used, which requires that the transmitter have an accurate estimate of the per-subcarrier, per-TX antenna channel, amplitude and phase. Therefore, an inaccuracy in the channel estimate can potentially result in a partial or full loss of gains from the MRT.

BRIEF DESCRIPTION OF THE DRAWINGS

Certain features of the subject technology are set forth in the appended claims. However, for purpose of explanation, several embodiments of the subject technology are set forth in the following figures.

FIG. 3 illustrates an example of a baseline algorithm for per-tone TX antenna selection beamforming in accordance with one or more implementations.

FIG. 4 illustrates an example of a method for performing per-tone TX antenna selection beamforming in accordance with one or more implementations.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block diagram form in order to avoid obscuring the concepts of the subject technology.

The subject technology may provide methods and implementations for per-tone TX antenna selection beamforming. The disclosed technology determines the spatial mapping matrix (Q) of a multi-antenna transmitter using a rough estimate of the per-subcarrier, per-TX antenna channel amplitude. In one or more implementations, the subject technology uses the knowledge of per-subcarrier, per-TX antenna channel amplitude to select the strongest channel. Therefore, the knowledge does not have to be precise. Various methods for determining the spatial mapping matrix are disclosed herein.

Figure 1:
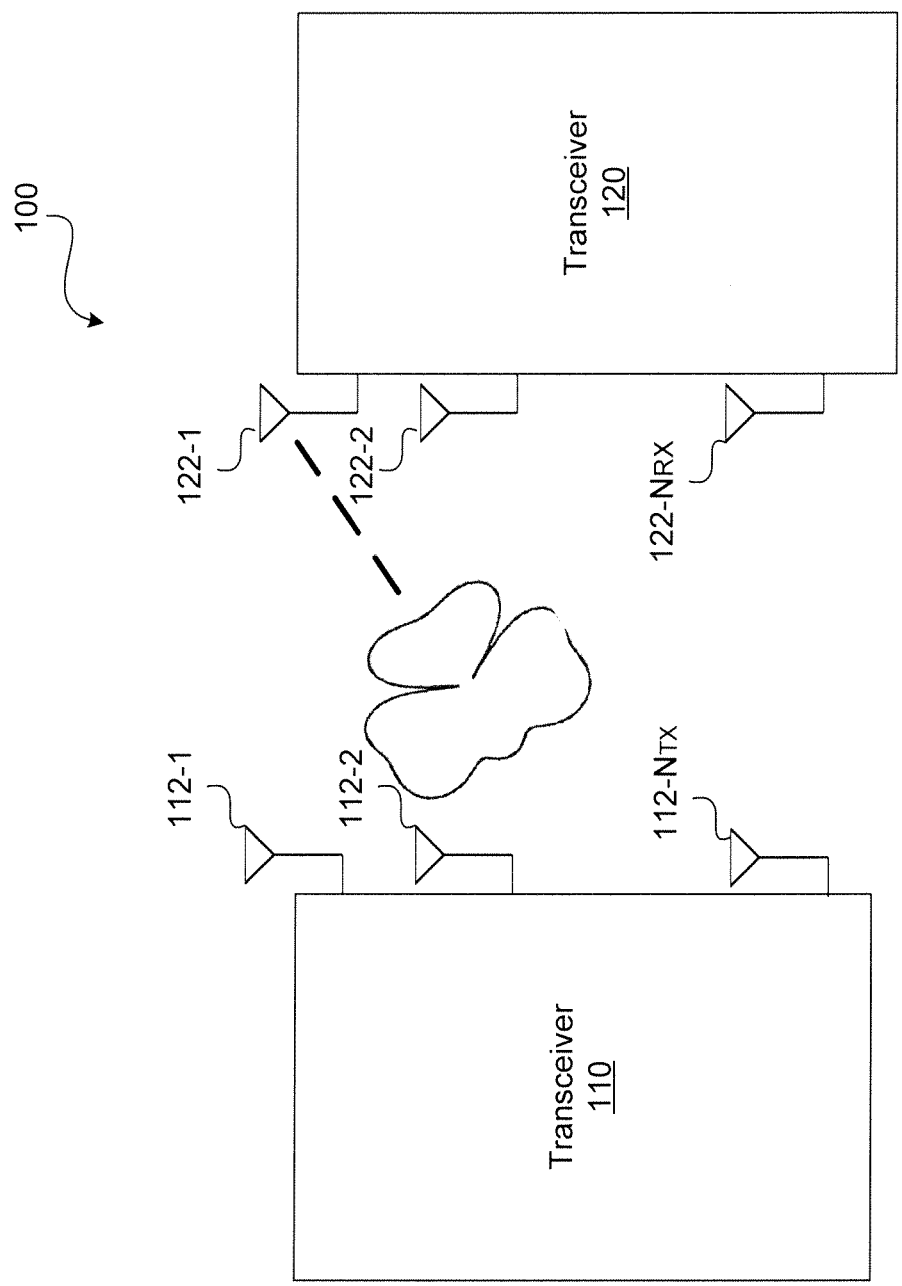
FIG. 1 illustrates an example of a network environment for realizing per-tone transmit (TX) antenna selection beamforming in accordance with one or more implementations.

FIG. 1 illustrates an example of a network environment 100 for realizing per-tone transmit (TX) antenna selection beamforming in accordance with one or more implementations of the subject technology. The network environment 100 includes a multi-antenna transceiver 110 and a multi-antenna transceiver 120 coupled through a wireless network such as Wi-Fi, 4G, LTE, WiMAX, or other wireless networks. The transceiver 110 includes a number of (e.g., $N_{TX}$, such as two or more) TX antennas 112 (e.g., 112-1 to 112-$N_{TX}$), and the transceiver 120 includes multiple (e.g., $N_{RX}$, such as two or more) receive (RX) antennas 122 (e.g., 122-1 to 122-$N_{RX}$). The subject technology for its operation as disclosed herein does need to work with the multiple RX antennas and a single RX antenna can be sufficient for proper performance of the disclosed solution. In one or more implementations, the transceiver 110 utilizes a per-tone antenna selection beamforming method to communicate with the transceiver 120 through one or more RX antennas 122 of the transceiver 120. The beamforming can target any of the RX antennas 122-1 to 122-$N_{RX}$ and significantly increases data throughput to the targeted antenna without the need for additional bandwidth or increased transmission power.

In one or more implementations, a beamformer (e.g., a transmitter 110) can perform per-tone TX antenna selection beamforming by obtaining an estimate of a per-tone channel amplitude information corresponding to each antenna 112. A spatial mapping matrix of the transmitter is then determined using the obtained estimate of the per-tone channel amplitude information corresponding to multiple antennas. Each tone includes an orthogonal frequency-division multiplexing (OFDM) sub-carrier. The per-tone channel amplitude information is the channel amplitude information pertinent to each tone of the OFDM signal. The per-tone channel amplitude value corresponding to each TX antenna (e.g., 112-1) is associated with a propagation channel between that TX antenna (e.g., 112-1) and an antenna (e.g., a RX antenna 122 such as 122-1) of a beamformee (e.g., a receiver of the transceiver 120). The spatial mapping matrix is determined such that data corresponding to each tone is transmitted through one of the TX antennas 112, and each of the TX antennas 112 is active during a transmission time of the transceiver 110. The spatial mapping matrix is used to generate TX signals for each of the TX antennas 112.

In some aspects, the spatial mapping matrix is determined such that data corresponding to each tone is transmitted through one of the TX antennas that delivers the largest channel power corresponding to that tone. Further, the spatial mapping matrix can be determined such that the transmission power is delivered via the TX antennas 112 in a balanced way, and a power transmitted by each antenna conforms to a corresponding power constraint of that antenna. Balancing power transmitted by each TX antenna (e.g., 112-1) includes scaling a power corresponding to that antenna based on a count of tones that are transmitted via that antenna, as explained in more details herein. Determining the spatial mapping matrix further can include using one or more algorithms described herein. Each algorithm can provide a scheme for allocating the antennas to different tones.

Figure 2A:
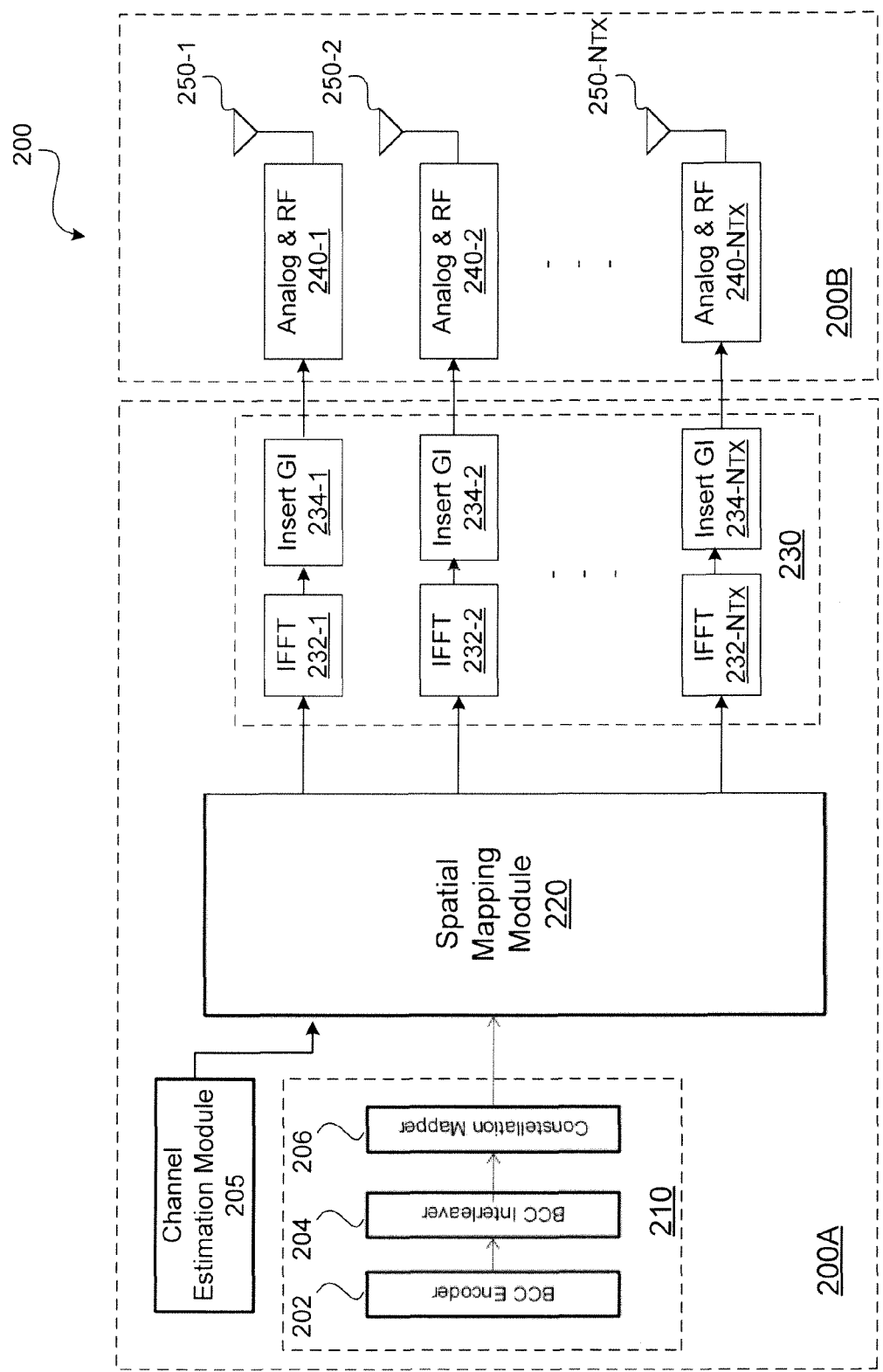
FIG. 2A conceptually illustrates an example of a multiple antenna transmitter with per-tone TX antenna selection beamforming in accordance with one or more implementations.

FIG. 2A conceptually illustrates an example of a multiple antenna transmitter 200 with per-tone antenna selection beamforming in accordance with one or more implementations of the subject technology. The multiple antenna transmitter 200 includes a baseband circuitry 200A and an analog and RF circuitry 200B. The baseband circuitry 200A consists of a number of modules, of which only a few more relevant modules such as a channel estimation module 205, a first processing module 210, a spatial mapping module 220, and a second processing module 230 are shown. All processing in the baseband circuitry 200A is performed in a digital domain and the results are converted to an analog domain via a digital-to-analog (DAC), which is not shown in FIG. 2A for simplicity. The analog and RF circuitry 200B includes analog and RF circuits 240 (e.g., 240-1 to 240-$N_{TX}$) each coupled to a TX antenna 250 (e.g., one of 250-1 to 250-$N_{TX}$).

In some implementations, the channel estimation module 205 obtains an estimate of the per-tone channel amplitude value by using one of an explicit feedback report from the receiver, or an implicit method. In the implicit method, the channel can be estimated based on a reverse direction transmission by the transceiver 120 of FIG. 1, and using the principle of channel reciprocity. According to the principle of channel reciprocity, the downlink channel is treated as equal to the transpose of the uplink channel, possibly after adjustment for a small difference in the TX and RX paths, which can be measured.

The first processing module 210 receives a binary form of an OFDM signal and generates an $N_t \times 1$ vector, where $N_t$ is the number of tones of the OFDM signal. The first processing module 210 includes, among other components, a binary convolutional code (BCC) encoder 202, a BCC interleaver 204, and a constellation mapper 206, which are known and description of which is not provided herein for brevity. The $N_t \times 1$ vector generated by the constellation mapper 206 is further processed by the spatial mapping module 220 as described in more details herein. The spatial mapping module 220 also receives an input from the channel estimation module 205. The spatial mapping module 220 generates a spatial mapping matrix of the transmitter using the estimate of the per-tone channel amplitude information corresponding to the TX antennas received from the channel estimation module 205. IN some implementations, the BCC encoder 202 and BCC interleaver 204 can be replaced by other forward error correction schemes such as a low-density parity check (LDPC) encoder and an LDPC tone interleaver.

The output of the spatial mapping module 220 corresponding to each of the TX antennas 250 is converted to a time domain signal by a respective inverse fast Fourier transform (IFFT) module 232 (e.g., one of IFFT modules 232-1 to 232-$N_{TX}$). The time domain signal is an OFDM signal for each antenna TX, in which guard intervals are inserted by the guard interval (GI) modules 234 (e.g., 234 to 234-$N_{TX}$). The guard intervals are inserted between OFDM symbols to make symbols immune to propagation delays, echoes, and reflections.

The analog and RF circuits 240 (e.g., 240-1 to 240-$N_{TX}$) include known components such as, mixers, filters, and power amplifiers and each provides transmission signal for one of the TX antennas 250.

Figure 2B:
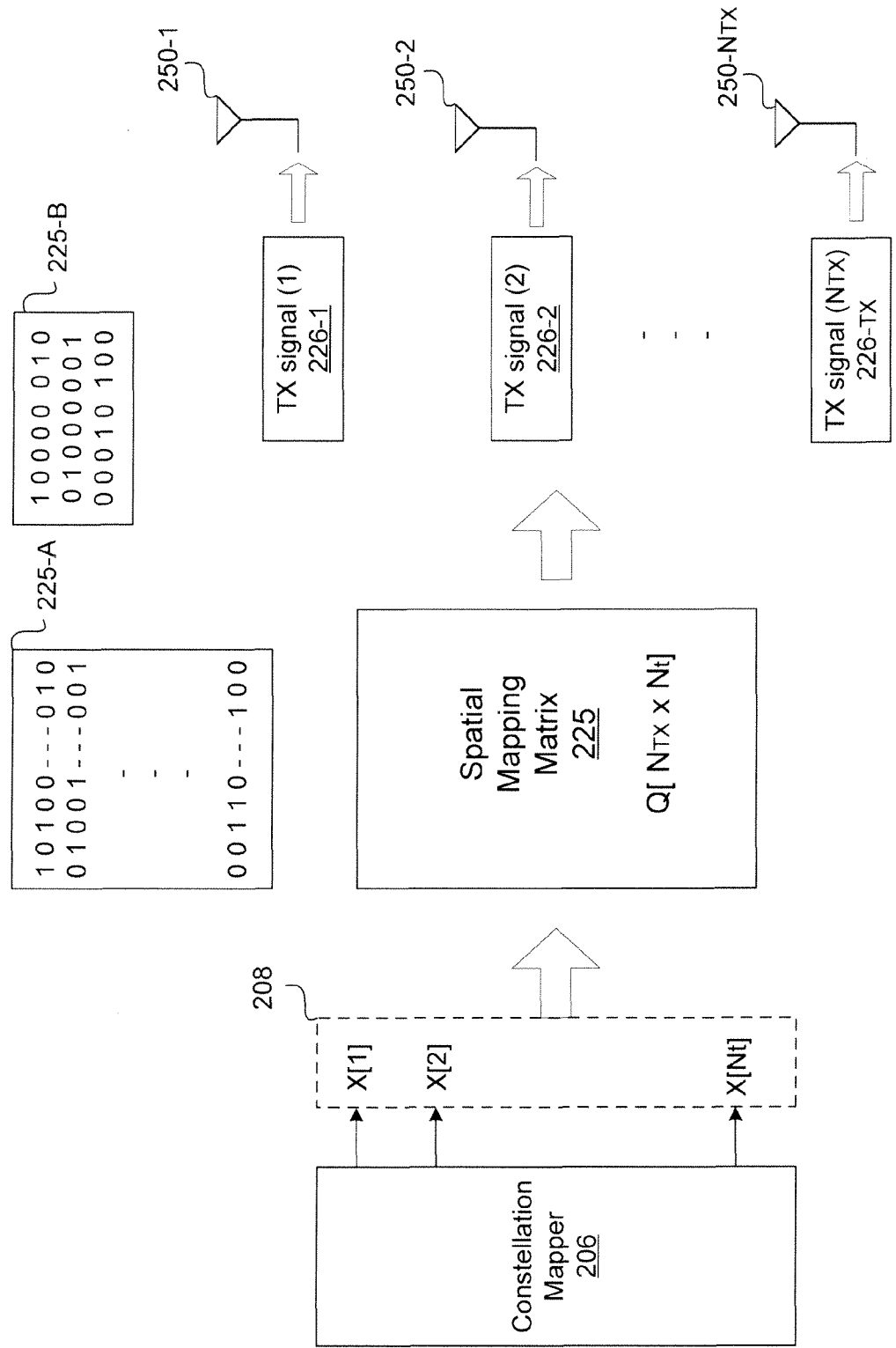
FIG. 2B illustrates an example of a spatial mapping processing for realizing per-tone antenna selection beamforming in accordance with one or more implementations.

FIG. 2B illustrates an example spatial mapping processing for realizing per-tone antenna selection beamforming in accordance with one or more implementations of the subject technology. The constellation mapper 206 generates an $N_t \times 1$ vector 208 including $N_t$ (e.g., 234 for 80 MHz transmission) elements X[1], X[2] . . . X[$N_t$] each corresponding to an OFDM signal tone. For example, the elements X[1], X[2] . . . X[$N_t$] can be quadrature amplitude modulation (QAM) symbols for the $N_t$ OFDM signal tones. In the spatial mapping module 220 of FIG. 2A, the $N_t \times 1$ vector 208 is element-wise multiplied by the spatial mapping matrix 225 to generate TX signals 226 (e.g., 226-1 to 226-$N_{TX}$). The spatial mapping matrix 225 is an $N_{TX}$ by $N_t$ matrix represented by Q[$N_{TX} \times N_t$], where $N_{TX}$ is the number of TX antennas of the transmitter (e.g., of transceiver 110 of FIG. 1). Elements of the spatial mapping matrix 225 can be any real number. An example of the spatial mapping matrix 225 is shown as a matrix 225-A, the elements of which are ones and zeros. The position j of a one ("1") in a row k of the matrix 225-A indicates a corresponding jth tone of the OFDM signal, the data of which is to be transmitted by the $k^{th}$ TX antenna that has the highest signal power for that tone. For example, a Q[3×8] matrix 225-B corresponds to 3 TX antennas and 8 tones, and indicates that the data corresponding to the $1^{st}$ and 7th tones are to be transmitted by the first TX antenna, the data corresponding to $2^{nd}$ and $8^{th}$ tones are to be transmitted by the $2^{nd}$ antenna, and data corresponding to the $4^{th}$ and $6^{th}$ tones are to be transmitted by the $3^{rd}$ antenna. The spatial mapping module 220 is tasked with selecting elements of the spatial mapping matrix 225 such that data corresponding to each tone of the OFDM signal is transmitted by one of the TX antennas that has the largest channel power corresponding to that tone, as described in more details herein.

The spatial mapping matrix 225 is used by the spatial mapping module 220 to generate TX signals 226 for the TX antennas 250. The TX signal 226-$i$ for the $i^{th}$ TX antenna can be written as: $X[1]\times Q[i,1]+X[2]\times Q[i,2]+ \ldots +X[N_t]\times Q[i,N_t]$. For example, using the 3×8 spatial mapping matrix 225-B, the TX signal for the $1^{st}$, $2^{nd}$, and $3^{rd}$ TX antenna are, respectively, (X[1]+X[7]), (X[2]+X[8]), and (X[4]+X[6]).

The spatial mapping module 220 determines the spatial mapping matrix 225 such that the transmission power delivered via the TX antennas is balanced and a power transmitted by each TX antenna conforms to a corresponding power constraint of that TX antenna. The power constraint may be a power constrained imposed by the federal communication committee (FCC), or may be due to hardware limitations.

FIG. 3 illustrates an example of a baseline algorithm 300 for per-tone TX antenna selection beamforming in accordance with one or more implementations of the subject technology. According to the baseline algorithm 300, for each tone of the OFDM signal a TX antenna which has the largest channel power is selected to transmit data corresponding to that tone (310). It is to be understood that, in spite of the traditional antenna selection schemes that use switches to select a TX antenna, in the disclosed solution, all TX antennas are active and the selection is on a per-tone basis and so is virtual rather than physical.

To determine the TX antenna with highest power for a $k^{th}$ tone of the $N_t$ tones, the power corresponding to the $u^{th}$ TX antenna is defined in terms of channel response (e.g., channel amplitude information) H(u,k) as: $P_{u,k}=|H(u,k)|^2$. Therefore, to find the TX antenna with highest power for a $k^{th}$ tone, the antenna with the highest $|H(u,k)|^2$ is declared as the selected antenna for that tone (320). For example, for a simple four-TX-antenna transmitter and for the $k^{th}$ tone, the highest of $|H(1,k)|^2$, $|H(2,k)|^2$, $|H(3,k)|^2$, and $|H(4,k)|^2$ is to be picked. In the four TX antenna transmitter case, for instance, if the $|H(3,k)|^2$ has the highest value, the $3^{rd}$ TX antenna is declared as the selected antenna for the $k^{th}$ tone. This translates to a spatial mapping matrix Q with [0 0 1 0] as its $k^{th}$ column. That is to say that among the elements Q[1,k], Q[2,k], Q[3,k], and Q[4,k], only Q[3,k] is non-zero (e.g., 1). The received signal on the $k^{th}$ tone at the receiver can be written as:

$Y_k=X[k]\times\{H(1,k)Q(1,K)+H(2,k)Q(2,K)+H(3,k)Q(3,K)+H(4,k)Q(4,K)\}+\text{noise}$ By repeating the above-described process for other tones, the number of tones that a TX antenna is selected for can be counted (330), and entries of the spatial mapping matrix Q is determined based on the count of tones for which a TX antenna is selected, and the power associated with each TX antenna is scaled to meet a power constraint to that TX antenna, without changing the antenna is used for each tone (340). For example, if the count of the number of times that $u^{th}$ TX antenna is selected in $N_u$, then the entries for the spatial mapping matrix Q(u,k) are selected as $$\sqrt{\frac{P_u}{N_u}},$$

where the $u^{th}$ TX antenna is selected on the $k^{th}$ tone, and 0, otherwise.

For example, in a three-TX-antenna scenario, if the TX antenna-1 is selected on half of tones, and each of the other TX antennas is selected on a quarter of tones, the tones transmitted on TX antenna-1 use 2/3 of per-tone power and tones using TX antenna-2 or TX antenna-3 use 4/3 of per-tone power. In some aspects, if a TX antenna is used on too many tones, some of those tones can be reassigned to a TX antenna that is under-utilized. For instance, if channel power from TX antenna-1 is the largest on every tone, then TX antenna-1 would be the only TX antenna that is used. In this case, the performance can potentially be improved by taking into account the number $N_u$ of times a TX antenna-u is selected, as discussed above. For instance, if on $k^{th}$ tone the TX antenna-1 is strongest but only slightly stronger than the TX antenna-2, and the TX antenna-1 is selected on many more tones than TX antenna-2, then it may be beneficial to select TX antenna-2 on the V tone. This is because the additional TX power that can be put the TX antenna-2 will make up for that fact that TX antenna-2 is slightly weaker than TX antenna-1 on the $k^{th}$ tone.

In some embodiments, the power of each TX antenna summed over all tones is constrained (e.g., by Pu). The power of $u^{th}$ TX antenna over all tones can be written as:

TX power on $u^{th}$ TX antenna$=\Sigma_{k=1}^{N}|Q(u,k)|^2 \leq Pu$

For this case, the constraint can be met with equality among TX antennas by scaling Q(u, k) as follows:

$Q(u,k)=\sqrt{(P_u/N_u)}$

Where, $N_u$ denotes the count of the tones on which TX antenna-u has been selected.

In some aspects, when the transmitter does not know the channel, but still has to choose entries for the spatial mapping matrix Q, so that all TX-antennas can be used, an antenna-cycling method can be employed. For example, the spatial mapping module 220 of FIG. 2A can use Q=[1 0 0] on tones 1, 4, 7 . . . , use Q=[010] on tones 2, 5, 8 . . . , and use Q=[001] on tones 3, 6, 9, and so on. The antenna cycling method may have similar performance to the currently employed cyclic shift diversity (CSD) method used in 802.11 applications, but has several advantages. For example, for each tone there is only one active TX antenna, so that there is no chance of coherent addition of the signal. In some regulatory domains, there is a disadvantage imposed on coherent schemes, therefore, this may allow antenna cycling to outperform CSD method.

In one or more implementations, a modification to the above-discussed baseline algorithm 300 can be used, which involves a number of iterations. The modified algorithm begins by an initialization step, in which the entries of the spatial mapping matrix Q can be selected based on the antenna cycling method. For example, initial vectors for the successive columns of the spatial mapping matrix Q are selected as [1 0 . . . 0], [01 . . . 0], etc. In the initial spatial mapping matrix $Q_0$, the count (e.g., $N_u$) of the number of non-zero entries in the $u^{th}$ row can be determined, where u varies between 1 to $N_{TX}$. In the next step, for the $1^{st}$ tone, the antenna is selected that is the solution to maximizing of $$|H(u,k)|^2 \times \left\{\frac{P_u}{N_u}\right\}$$

with respect to the parameter u, using the determined $N_u$. Then, N1, N2, etc. are recomputed, where $N_u$ is defined as the count of the number of tones on which TX antenna-u has been selected. In the following step, the previous step of maximizing and re-computing N1, N2, etc. is sequentially repeated for other tones (e.g., $2^{nd}$, $3^{rd}$, $4^{th}$, etc.). Once all tones are gone through, the process can be repeated in as many iterations as desired or until the process is converged, as by reaching a stopping criterion. The stopping criterion can be reached, for example, when a solution on a current iteration is identical or very close to a solution from a previous iteration. It is understood that with N1=N2=N3 . . . , which can happen is rare circumstances, the above modified algorithm may be no different than the baseline algorithm 300.

In some aspects, instead of initializing using the antenna cycling method, the spatial mapping matrix Q may be set to a Q obtained using the baseline algorithm, which was based on highest antenna power per tone. In one or more aspects, in order to save computation time, instead of re-computing N1, N2, etc. after every tone, the re-computation can be performed every L tones, where L is a defined value larger than one.

In one or more implementations, using a second algorithm, the TX antenna for the first group of L1 tones is selected based on the baseline algorithm 300. Next, the number of times (Nu) that each TX antenna (e.g., TX antenna-u) has been selected on the first group of L1 tones is determined. For the next group of L2 tones, the TX antenna is selected by maximizing $$|H(u,k)|^2 \times \left\{\frac{P_u}{N_u}\right\}$$

using the determined Nu for all TX antennas, and the count ($N_{u1}$) of the number of times each antenna has been selected on the (L1+L2) tones is determined. For the next group of L3 tones the TX antenna is selected by maximizing $$|H(u,k)|^2 \times \left\{\frac{P_u}{N_{u1}}\right\}$$

using the determined $N_{u1}$ for all TX antennas. The values of L1, L2, and L3 can be selected as desired.

In one or more implementations, the per-tone antenna selection can be performed, using a third algorithm, which includes the following steps: a) build an initial [$N_{TX}$, $N_t$] matrix by filling the rows and columns of the initial matrix with respective channel power values (e.g., |H(u,k)|²); b) find the largest channel power value in the initial matrix and select a corresponding TX-antenna for the tone associated with that channel power value; c) cross out the channel power values associated with that tone from the initial matrix to reach at a first matrix; and d) return to step b and continue the iteration until a TX-antenna is selected for every tone. For example, if entry [3,99] of the matrix is the largest channel power value in the entire initial matrix, TX-antenna-3 is selected for tone 99, all channel power values corresponding to tone 99 (e.g., in column 99) are crossed out to obtain the first matrix, and the largest channel power value in the first matrix is found and so on. In some aspects, the iterations can be continued until each TX-antenna has been selected N (e.g., a predefined parameter) times. To achieve a completely balance solution, N can be chosen as the number of tones (e.g., $N_t$) divided by the number of TX-antennas (e.g., $N_{TX}$). After the completion of the antenna selection process, the antenna power constraint can be met as explained above.

In some implementations, the third algorithm may be modified as described below as a fourth algorithm. The fourth algorithm includes similar steps as described above with respect to the third algorithm, except that, the tone is selected based on the largest spread between the largest channel power value and the second largest channel power value. In other words, instead of selecting the largest channel power value, for each tone, a ratio $R_k$ between the largest channel power value and the second largest channel power value is found, the largest value $R_{kM}$ of all $R_k$'s in the matrix is determined, the TX-antenna corresponding to $R_{kM}$ is selected for the corresponding tone, and the matrix channel power value entry corresponding to $R_{kM}$ is crossed out. The fourth algorithm continues to go through a number of iterations until a TX-antenna is selected for every tone. In some aspects, the iterations can be continued until each TX-antenna has been selected N (e.g., a predefined parameter) times. To achieve a completely balance solution, N can be chosen as the number of tones (e.g., $N_t$) divided by the number of TX-antennas (e.g., $N_{TX}$). After the completion of the antenna selection process, the antenna power constraint can be met as explained above.

In one or more implementations, the basic algorithm may be modified as described below using a first and a second variation. The basic algorithm can go through the tones in a numerical order (e.g., lowest to highest) and for each tone, can select the antenna with the largest $$|H(u,k)|^2 \times \left\{\frac{P_u}{N_{u1}}\right\}.$$

In the first variation, instead of addressing the tones in the numerical order, first a tone with the largest channel power (e.g., |H(u,k)|²) value is addressed, and the antenna selection for that tone is performed based on a largest $$|H(u,k)|^2 \times \left\{\frac{P_u}{N_{u1}}\right\}$$

value. Then a tone with the largest channel power value among the remaining tones is addressed and so on. In the second variation, the tones are addressed based on the largest spread between the largest channel power value and the second largest channel power value (e.g., as explained above with respect to the fourth algorithm). For example, first a tone with the largest ratio $R_k$ is addressed (e.g., by TX-antenna selection based on $$|H(u,k)|^2 \times \left\{\frac{P_u}{N_{u1}}\right\}$$

value), then the tone with the second largest $R_k$ is addressed, and so on.

It is understood that, although in the above-disclosed algorithms some decisions are made based on the channel power value (e.g., |H(u,k)|²), but the amount of data that can be transmitted over a wireless link does not have to be linearly proportional to |H(u,k)|². For example, each of the above-disclosed algorithms can be potentially improved by replacing the $$|H(u,k)|^2 \times \left\{\frac{P_u}{N_{u1}}\right\}$$

with a quantity that is a function of the $$|H(u,k)|^2 \times \left\{\frac{P_u}{N_{u1}}\right\} \left(\text{e.g., } f\left(|H(u,k)|^2 \times \left\{\frac{P_u}{N_{u1}}\right\}\right)\right).$$

The function can take any form. In some aspects, a Shannon capacity function can be used. The Shannon capacity function, for example, can be expressed as: f(x)=log 2(1+x), where f(x)=mutual information of specified QAM constellations (e.g., 4, 16, 64, or 256) at SNR=x, in an additive white Gaussian noise (AWGN) channel. In order to use this expression, transmitter would have to pick a constellation size. This could be the constellation size that the transmitter has to actually use for the next frame, or it could be determined based on the transmitter's best estimate.

In some aspects, where the receiver has multiple antennas, the second algorithms can be applied, except that the power of the channel per antenna (e.g., $|H(u,k)|^2$), which was defined as the power from the TX antenna-u on the $k^{th}$ tone is the aggregate RX power (e.g., summed across all RX antennas) from the TX antenna-u on the $k^{th}$ tone.

FIG. 4 illustrates an example of a method 400 for performing per-tone TX antenna selection beamforming in accordance with one or more implementations of the subject technology. For explanatory purposes, the blocks of the example method 400 are described herein as occurring in serial, or linearly. However, multiple blocks of the example method 400 can occur in parallel. In addition, the blocks of the example method 400 need not be performed in the order shown and/or one or more of the blocks of the example method 400 need not be performed.

The method 400 includes obtaining an estimate of a per-tone channel amplitude information corresponding to each antenna (e.g., 112-1 to 112-$N_{TX}$ of FIG. 1) of a transmitter (e.g., of 110 of FIG. 1) (410). A spatial mapping matrix (e.g., 225 of FIG. 2B) of the transmitter is determined (e.g., 220 of FIG. 2A) using the obtained estimate of the per-tone channel amplitude information corresponding to the antennas (420). Each tone includes an orthogonal frequency-division multiplexing (OFDM) sub-carrier (e.g., elements of 208 of FIG. 2B), and the per-tone channel amplitude information corresponding to each antenna is associated with a propagation channel between that antenna and an RX antenna (e.g., 122-1 to 122-$N_{RX}$ of FIG. 1) of a receiver (e.g., of 120 of FIG. 1). The spatial mapping matrix is determined to allow transmission of data corresponding to each tone through one of the antennas, and to allow each antenna to be active during a transmission time of the transmitter.

Figure 5:
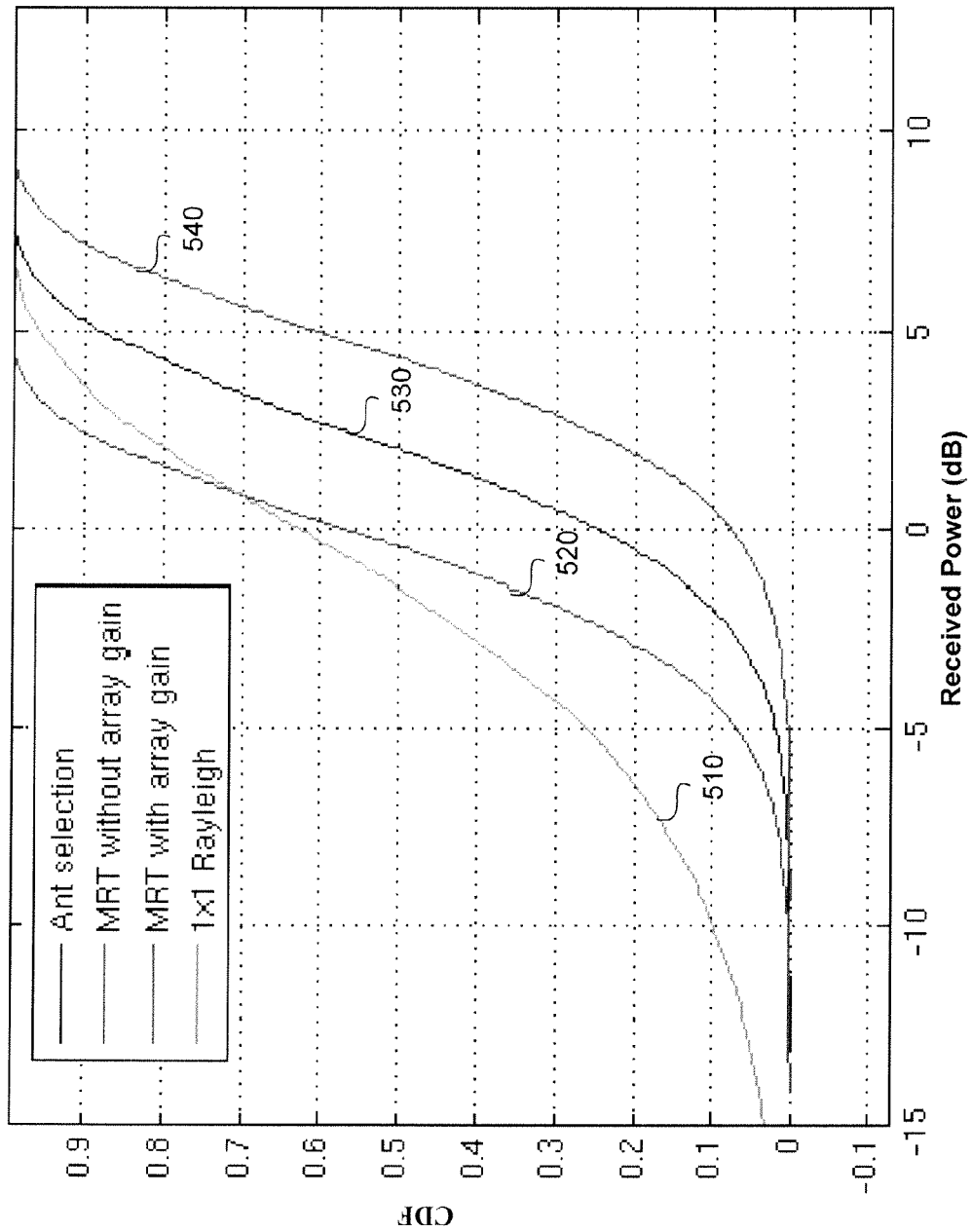
FIG. 5 is a diagram illustrating example plots of cumulative distribution functions (CDFs) for various beamforming methods including per-tone TX antenna selection beamforming in accordance with one or more implementations.

FIG. 5 is a diagram illustrating example plots of cumulative distribution functions (CDFs) for various beamforming methods including per-tone TX antenna selection beamforming in accordance with one or more implementations of the subject technology. The plots 510, 520, 530, and 540 show variation of CDF of received power (dB) for various beamforming scenarios. The plot 510 represents a scenario with no beamforming (e.g., a single TX antenna and a single RX antenna). The plot 520 shows maximum ratio transmission (MRT), which as a known beamforming strategy, as is implemented today with regulatory restrictions imposing back off on transmit power. Plot 530 shows performance result of the subject technology, and plot 540 is for the MRT method with array gain, which shows the best result that the MRT method can achieve. The plot 530 of the subject technology is seen to indicate an achievement of significant performance improvement over the existing solution (e.g., plot 520).

Figure 6:
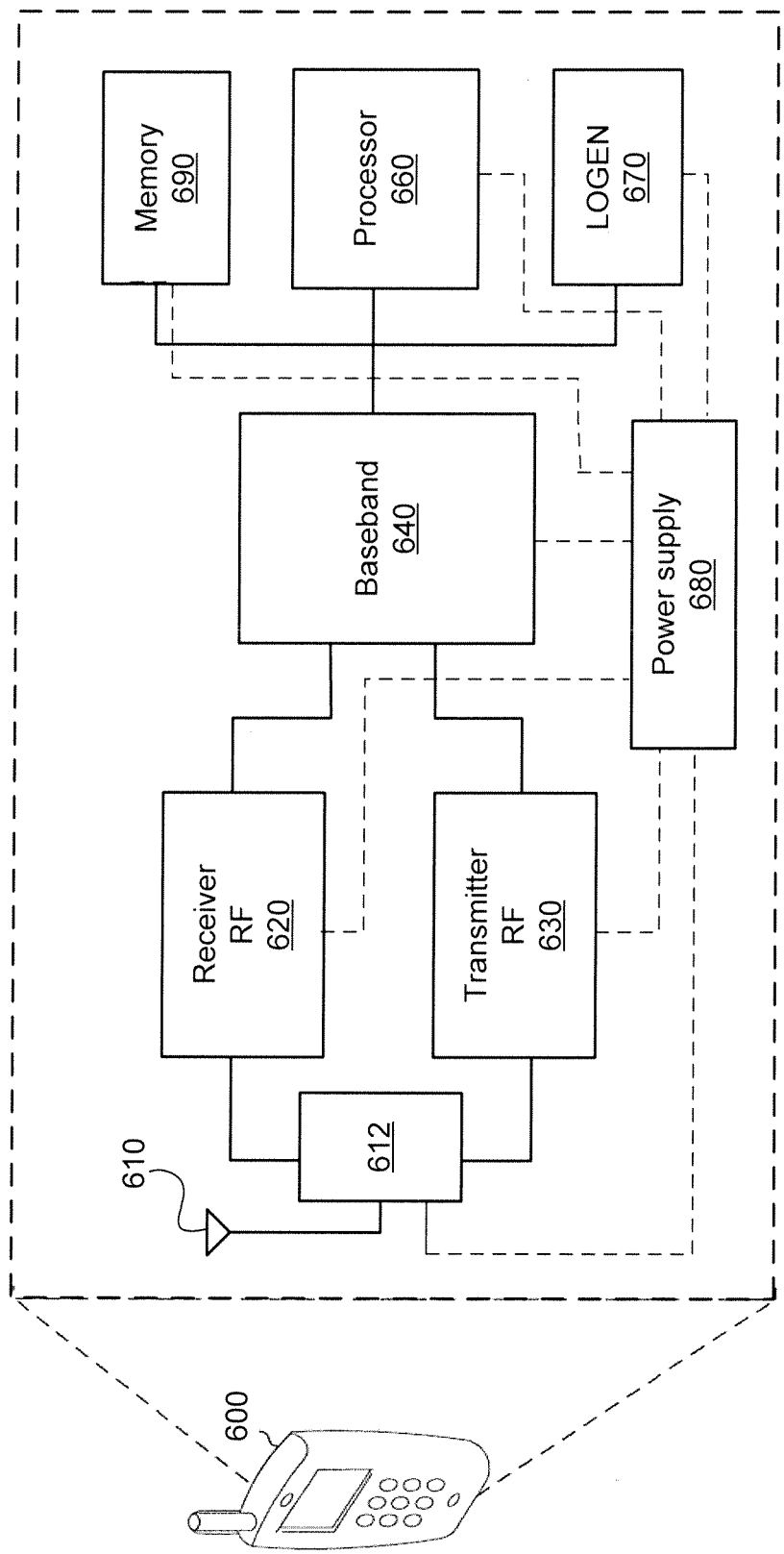
FIG. 6 illustrates an example of a communication device using per-tone TX antenna selection beamforming in accordance with one or more implementations.

FIG. 6 illustrates an example of a communication device 600 using per-tone TX antenna selection beamforming in accordance with one or more implementations of the subject technology. The wireless communication device 600 may comprise a radio-frequency (RF) antenna 610, a receiver 620, a transmitter 630, a baseband processing module 640, a memory 650, a processor 660, and a local oscillator generator (LOGEN) 670. In various embodiments of the subject technology, one or more of the blocks represented in FIG. 6 may be integrated on one or more semiconductor substrates. For example, the blocks 620-670 may be realized in a single chip or a single system on chip, or may be realized in a multi-chip chipset.

The RF antenna 610 may be suitable for transmitting and/or receiving RF signals (e.g., wireless signals) over a wide range of frequencies. Although a single RF antenna 610 is illustrated, the subject technology is not so limited. In some implementations, as described herein, the RF antenna 610 may include a number of antennas, which can realize the TX and RX antennas 112 and 122 of FIG. 1.

The receiver 620 may comprise suitable logic circuitry and/or code that may be operable to receive and process signals from the RF antenna 610. The receiver 620 may, for example, be operable to amplify and/or down-covert received wireless signals. In various embodiments of the subject technology, the receiver 620 may be operable to cancel noise in received signals and may be linear over a wide range of frequencies. In this manner, the receiver 620 may be suitable for receiving signals in accordance with a variety of wireless standards. Wi-Fi, WiMAX, Bluetooth, and various cellular standards. In various embodiments of the subject technology, the receiver 620 may not require any SAW filters and few or no off-chip discrete components such as large capacitors and inductors.

The transmitter 630 may comprise suitable logic circuitry and/or code that may be operable to process and transmit signals from the RF antenna 610. The transmitter 630 may, for example, be operable to up-covert baseband signals to RF signals and amplify RF signals. In various embodiments of the subject technology, the transmitter 630 may be operable to up-convert and amplify baseband signals processed in accordance with a variety of wireless standards. Examples of such standards may include Wi-Fi, WiMAX, Bluetooth, and various cellular standards. In various embodiments of the subject technology, the transmitter 630 may be operable to provide signals for further amplification by one or more power amplifiers.

The duplexer 612 may provide isolation in the transmit band to avoid saturation of the receiver 620 or damaging parts of the receiver 620, and to relax one or more design requirements of the receiver 620. Furthermore, the duplexer 612 may attenuate the noise in the receive band. The duplexer may be operable in multiple frequency bands of various wireless standards.

The baseband processing module 640 may comprise suitable logic, circuitry, interfaces, and/or code that may be operable to perform processing of baseband signals. The baseband processing module 640 may, for example, analyze received signals and generate control and/or feedback signals for configuring various components of the wireless communication device 600 such as the receiver 620. The baseband processing module 640 may be operable to encode, decode, transcode, modulate, demodulate, encrypt, decrypt, scramble, descramble, and/or otherwise process data in accordance with one or more wireless standards.

In some implementations, the baseband processing module 640 can achieve per-tone transmit (TX) antenna selection beamforming. For example, the transmitter 630 can obtain an estimate of a per-tone channel amplitude information corresponding to each antennas of the RF antenna 610, and the baseband processing module 640 can determining a spatial mapping matrix of the transmitter using the obtained estimate of the per-tone channel amplitude information corresponding to the RF antenna 610. In other words, the baseband processing module 640 can perform the functionalities of the spatial mapping module 220 of FIG. 2A, as described above.

The processor 660 may comprise suitable logic, circuitry, and/or code that may enable processing data and/or controlling operations of the wireless communication device 600. In this regard, the processor 660 may be enabled to provide control signals to various other portions of the wireless communication device 600. The processor 660 may also control transfers of data between various portions of the wireless communication device 600. Additionally, the processor 660 may enable implementation of an operating system or otherwise execute code to manage operations of the wireless communication device 600.

The memory 650 may comprise suitable logic, circuitry, and/or code that may enable storage of various types of information such as received data, generated data, code, and/or configuration information. The memory 650 may comprise, for example, RAM, ROM, flash, and/or magnetic storage. In various embodiment of the subject technology, Information stored in the memory 650 may be utilized for configuring the receiver 620 and/or the baseband processing module 640. The local oscillator generator (LOG EN) 670 may comprise suitable logic, circuitry, interfaces, and/or code that may be operable to generate one or more oscillating signals of one or more frequencies. The LOGEN 670 may be operable to generate digital and/or analog signals. In this manner, the LOGEN 670 may be operable to generate one or more clock signals and/or sinusoidal signals. Characteristics of the oscillating signals such as the frequency and duty cycle may be determined based on one or more control signals from, for example, the processor 660 and/or the baseband processing module 640.

In operation, the processor 660 may configure the various components of the wireless communication device 600 based on a wireless standard according to which it is desired to receive signals. Wireless signals may be received via the RF antenna 610 and amplified and down-converted by the receiver 620. The baseband processing module 640 may perform noise estimation and/or noise cancellation, decoding, and/or demodulation of the baseband signals. In this manner, information in the received signal may be recovered and utilized appropriately. For example, the information may be audio and/or video to be presented to a user of the wireless communication device, data to be stored to the memory 650, and/or information affecting and/or enabling operation of the wireless communication device 600. The baseband processing module 640 may modulate, encode and perform other processing on audio, video, and/or control signals to be transmitted by the transmitter 630 in accordance to various wireless standards.

Those of skill in the art would appreciate that the various illustrative blocks, modules, elements, components, and methods described herein can be implemented as electronic hardware, computer software, or combinations of both. To illustrate this interchangeability of hardware and software, various illustrative blocks, modules, elements, components, and methods have been described above generally in terms of their functionality. Whether such functionality is implemented as hardware or software depends upon the particular application and design constraints imposed on the overall system. Skilled artisans can implement the described functionality in varying ways for each particular application. Various components and blocks can be arranged differently (e.g., arranged in a different order, or partitioned in a different way) all without departing from the scope of the subject technology.

As used herein, the phrase at least one of preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

A phrase such as "an aspect" does not imply that such aspect is essential to the subject technology or that such aspect applies to all configurations of the subject technology. A disclosure relating to an aspect can apply to all configurations, or one or more configurations. An aspect can provide one or more examples of the disclosure. A phrase such as an "aspect" refers to one or more aspects and vice versa. A phrase such as an "embodiment" does not imply that such embodiment is essential to the subject technology or that such embodiment applies to all configurations of the subject technology. A disclosure relating to an embodiment can apply to all embodiments, or one or more embodiments. An embodiment can provide one or more examples of the disclosure. A phrase such an "embodiment" can refer to one or more embodiments and vice versa. A phrase such as a "configuration" does not imply that such configuration is essential to the subject technology or that such configuration applies to all configurations of the subject technology. A disclosure relating to a configuration can apply to all configurations, or one or more configurations. A configuration can provide one or more examples of the disclosure. A phrase such as a "configuration" can refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein can be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method for per-tone transmit (TX) antenna selection beamforming, the method comprising:
 obtaining an estimate of a per-tone channel amplitude information corresponding to each antenna of a plurality of antennas of a transmitter; and
 determining a spatial mapping matrix of the transmitter using the obtained estimate of the per-tone channel amplitude information corresponding to the plurality of antennas,
 wherein each tone comprises an orthogonal frequency-division multiplexing (OFDM) sub-carrier, the per-tone channel amplitude information corresponding to each antenna of a plurality of antennas is associated with a propagation channel between that antenna and a receive (RX) antenna of a receiver, and the spatial mapping matrix is determined to allow transmission of data corresponding to each tone through one of the plurality of antennas, and to allow each of the plurality of antennas to be active during a transmission time of the transmitter.

2. The method of claim 1, further comprising using the spatial mapping matrix to generate TX signals for each of the plurality of antennas.

3. The method of claim 1, wherein obtaining the estimate of the per-tone channel amplitude value comprises using at least one of an explicit feedback report from the receiver or an implicit method.

4. The method of claim 1, wherein the spatial mapping matrix is determined to allow data corresponding to each tone to be transmitted through one of the plurality of antennas that has the largest channel power corresponding to that tone.

5. The method of claim 1, wherein the spatial mapping matrix is determined to allow the transmission power to be delivered via the plurality of antennas in a balanced way and a power transmitted by each antenna of the plurality of antennas conforms to a corresponding power constraint of that antenna.

6. The method of claim 5, wherein balancing power transmitted by each antenna of the plurality of antennas comprises scaling a power corresponding to each antenna of the plurality of antennas based on a count of tones that are transmitted via that antenna.

7. The method of claim 5, wherein determining the spatial mapping matrix comprises using one or more algorithms, each algorithm providing a scheme for allocating the plurality of antennas to different tones.

8. The method of claim 5, wherein the scheme for allocating the plurality of antennas to the different tones comprises selecting an antenna of the plurality of antennas per each tone based on the channel power per antenna for that tone and the number of tones for which the antenna of the plurality of antennas has already been selected.

9. A device for per-tone beamforming of a plurality of transmit (TX) antennas, the device comprising:
 a channel estimation module configured to obtain an estimate of a per-tone channel amplitude data corresponding to each antenna of the plurality of TX antennas; and
 a spatial mapping module configured to determine a spatial mapping matrix using the obtained estimate of the per-tone channel data corresponding to the plurality of TX antennas,
 wherein each tone comprises an orthogonal frequency-division multiplexing (OFDM) sub-carrier, wherein the per-tone channel data corresponding to each antenna of a plurality of TX antennas is associated with a propagation channel between that antenna and a receive (RX) antenna of a receiver, and wherein the spatial mapping module is configured to determine the spatial mapping matrix to allow transmission of data corresponding to each tone through one of the plurality of TX antennas and to allow each of the plurality of TX antennas to be active during a transmission time of the transmitter.

10. The device of claim 9, wherein the spatial mapping module is configured to use the spatial mapping matrix to generate TX signals for each of the plurality of antennas.

11. The device of claim 9, wherein the channel estimation module is configured to obtain the estimate of the per-tone channel amplitude value by using at least one of an explicit feedback report from the receiver or an implicit method.

12. The device of claim 9, wherein the spatial mapping module is configured to determine the spatial mapping matrix such that data corresponding to each tone is transmitted through one of the plurality of TX antennas that has the largest channel power corresponding to that tone.

13. The device of claim 9, wherein the spatial mapping module is configured to determine the spatial mapping matrix to allow the transmission power to be delivered via the plurality of TX antennas in a balanced way and a power transmitted by each antenna of the plurality of TX antennas to conform to a corresponding power constraint of that antenna.

14. The device of claim 13, wherein the spatial mapping module is configured to balance power transmitted by each antenna of the plurality of TX antennas by scaling a power corresponding to each antenna of the plurality of TX antennas based on a count of tones that are transmitted via that antenna.

15. The device of claim 13, wherein the spatial mapping module is configured to determine the spatial mapping matrix by using one or more algorithms, wherein each algorithm is configured to provide a scheme for allocating the plurality of TX antennas to different tones.

16. The device of claim 13, wherein each algorithm is configured to provide the scheme for allocating the plurality of TX antennas to the different tones by selecting an antenna of the plurality of TX antennas per each tone based on the channel power per antenna for that tone and the number of tones for which the antenna of the plurality of TX antennas has already been selected.

17. A communication system comprising:
 memory; and
 one or more processors configured to execute instructions to implement a method comprising:
  estimating a per-tone channel data corresponding to each antenna of a plurality of transmit (TX) antennas; and
  determining a spatial mapping matrix using the estimated per-tone channel data corresponding to the plurality of TX antennas,
  wherein each tone comprises an orthogonal frequency-division multiplexing (OFDM) sub-carrier, wherein the per-tone channel data corresponding to each antenna of a plurality of TX antennas is associated with a propagation channel between that antenna and a receive (RX) antenna of a receiver, and wherein determining the spatial mapping matrix comprises allowing transmission of data corresponding to each tone through one of the plurality of TX antennas, and to allowing each of the plurality of TX antennas to be active during a transmission time of the transmitter.

18. The system of claim 17, wherein the method further comprises using the spatial mapping matrix to generate TX signals for each of the plurality of antennas.

19. The system of claim 17, wherein determining the spatial mapping matrix comprises allowing data corresponding to each tone to be transmitted through one of the plurality of TX antennas that has the largest channel power corresponding to that tone.

20. The system of claim 17, wherein determining the spatial mapping matrix comprises allowing the transmission power to be delivered via the plurality of antennas in a balanced way, and allowing power transmitted by each antenna of the plurality of antennas to conform to a corresponding power constraint of that antenna.

* * * * *